United States Patent
Kim

(10) Patent No.: US 12,477,202 B2
(45) Date of Patent: Nov. 18, 2025

(54) CAMERA MODULE

(71) Applicant: SAMSUNG ELECTRO-MECHANICS CO., LTD., Suwon-si (KR)

(72) Inventor: Hyun Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 283 days.

(21) Appl. No.: 18/188,535

(22) Filed: Mar. 23, 2023

(65) Prior Publication Data

US 2024/0163539 A1    May 16, 2024

(30) Foreign Application Priority Data

Nov. 14, 2022 (KR) .................. 10-2022-0151946

(51) Int. Cl.
*H04N 23/55* (2023.01)
*G03B 17/17* (2021.01)

(52) U.S. Cl.
CPC .............. *H04N 23/55* (2023.01); *G03B 17/17* (2013.01)

(58) Field of Classification Search
CPC .......... G03B 17/17; G03B 30/00; G03B 5/00; H04N 23/55; H04N 23/57
See application file for complete search history.

(56) References Cited

U.S. PATENT DOCUMENTS

| | | | | |
|---|---|---|---|---|
| 12,047,663 B2* | 7/2024 | Wang | ...................... | G02B 5/04 |
| 2006/0072912 A1* | 4/2006 | Momochi | ................. | G03B 5/00 |
| | | | | 396/55 |
| 2007/0019104 A1* | 1/2007 | Inoue | .................... | H04N 23/687 |
| | | | | 348/222.1 |
| 2007/0139786 A1* | 6/2007 | Iwasawa | ............... | G02B 13/007 |
| | | | | 359/676 |
| 2007/0183043 A1* | 8/2007 | Bito | ........................ | G03B 17/17 |
| | | | | 359/557 |
| 2008/0068730 A1* | 3/2008 | Matsui | ................. | G02B 27/646 |
| | | | | 359/726 |
| 2008/0186397 A1 | 8/2008 | Kim | | |
| 2013/0176479 A1* | 7/2013 | Wada | ..................... | G03B 17/17 |
| | | | | 359/691 |
| 2013/0188071 A1* | 7/2013 | Fujita | ................... | H04N 23/617 |
| | | | | 348/222.1 |
| 2017/0134657 A1* | 5/2017 | Mukunashi | .......... | G02B 27/646 |
| 2017/0139184 A1* | 5/2017 | Bae | ....................... | G02B 13/007 |
| 2020/0371407 A1* | 11/2020 | Tseng | ..................... | H04N 23/51 |
| 2021/0289111 A1 | 9/2021 | Lim et al. | | |

(Continued)

FOREIGN PATENT DOCUMENTS

| | | |
|---|---|---|
| JP | 2005-84285 A | 3/2005 |
| JP | 2007-33476 A | 2/2007 |

(Continued)

OTHER PUBLICATIONS

Korean Office Action issued on Jul. 3, 2024 in corresponding Korean Patent Application No. 10-2022-0151946. (8 pages in English and 6 pages in Korean).

*Primary Examiner* — Amy R Hsu
(74) *Attorney, Agent, or Firm* — NSIP Law

(57) ABSTRACT

A camera module includes a first prism having refractive power, a first lens module disposed adjacently to an object-side surface of the first prism, and a first driving member driving the first lens module in a direction intersecting an optical axis.

20 Claims, 10 Drawing Sheets

(56) References Cited

U.S. PATENT DOCUMENTS

2022/0342276 A1* 10/2022 Min ................. H04N 23/55
2023/0367135 A1* 11/2023 Park ................. G03B 5/06

FOREIGN PATENT DOCUMENTS

| KR | 10-2006-0009526 A | 2/2006 |
| KR | 10-2017-0056255 A | 5/2017 |
| KR | 10-2019-0137036 A | 12/2019 |
| KR | 10-2021-0000069 A | 1/2021 |
| KR | 10-2021-0115420 A | 9/2021 |

* cited by examiner

CAMERA MODULE

CROSS-REFERENCE TO RELATED APPLICATIONS

This application claims the benefit under 35 USC 119(a) of Korean Patent Application No. 10-2022-0151946 filed on Nov. 14, 2022, in the Korean Intellectual Property Office, the entire disclosure of which is incorporated herein by reference for all purposes.

BACKGROUND

1. Field

The present disclosure relates to a camera module which may be easily mounted in a portable terminal or in a small electronic product.

2. Description of the Background

A camera module may be mounted in a portable terminal or in a small electronic product. However, a camera module having a long focal length such as a telephoto camera module may have a considerable size, and thus may be difficult to mount in a portable terminal. For example, in a telephoto camera module, a distance from an object-side surface of the forwardmost lens to an image sensor may be greater than a thickness of the portable terminal, which hinders the portable terminal from having a smaller thickness. A camera module including a prism or a reflecting member has been proposed to solve the above-mentioned problem. However, this camera module may require an increased installation space of the camera module due to the prism and the reflecting member.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first prism having refractive power, a first lens module disposed adjacently to an object-side surface of the first prism, and a first driving member driving the first lens module in a direction intersecting an optical axis.

The first prism may have an object-side surface or an image-side surface having a convex shape.

The first prism may have an object-side surface or an image-side surface having a concave shape.

The first driving member may include a first driving magnet and a first driving coil.

The camera module may further include a second lens module disposed between the first prism and an image sensor.

The second lens module may include a non-circular lens having a length in a first direction intersecting the optical axis and a length in a second direction intersecting the optical axis that are different from each other.

The camera module may further include a second driving member driving the second lens module along the optical axis.

The camera module may further include a second prism disposed adjacently to an image-side surface of the first prism.

The second prism may have refractive power.

At least one of an object-side surface and an image-side surface of the second prism may have a convex shape.

The camera module may further include a second lens module disposed between the first prism and the second prism.

An electronic device may include the camera module, and an image sensor configured to convert an optical signal of incident light passing through the first lens module and the first prism into an electrical signal.

In another general aspect, a camera module includes a first prism having refractive power, a first lens module disposed adjacently to an object-side surface of the first prism, a first driving member driving the first lens module in a first direction intersecting an optical axis, and a second driving member driving the first prism in a second direction intersecting the optical axis.

In another general aspect, an electronic device includes a camera device including a first prism changing a path of incident light, a first lens module disposed on an object-side surface of the first prism, a second prism having refractive power disposed on an image-side surface of the first prism, and an image sensor configured to convert an optical signal of incident light passing through the first lens module, the first prism, and the second prism into an electrical signal.

The electronic device may further include a first driving member driving the first lens module in a first direction intersecting an optical axis, wherein the first prism may have refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
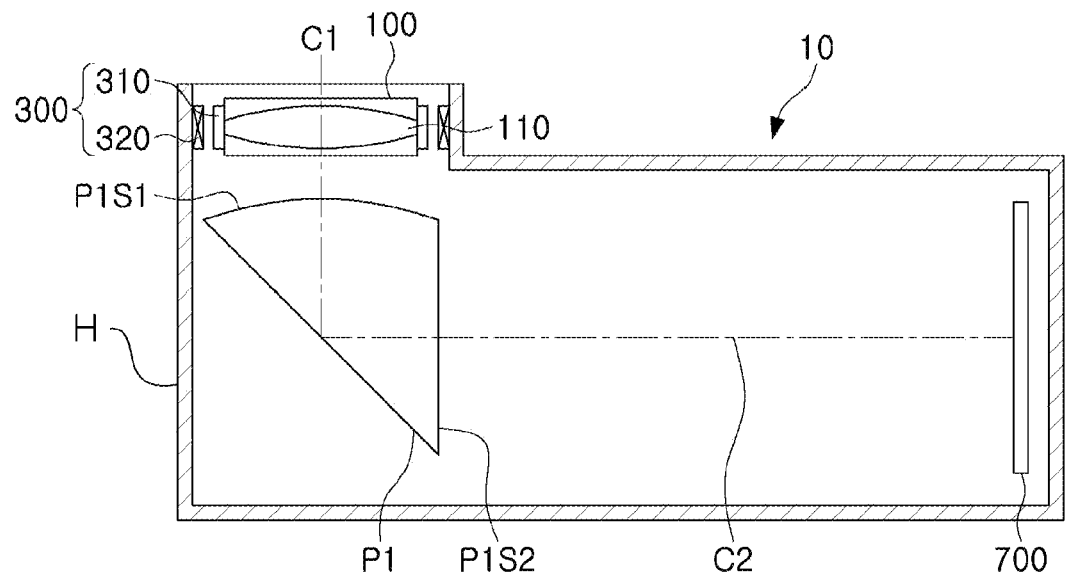
FIG. 1 is a configuration diagram of a camera module according to an example embodiment of the present disclosure.
Figure 2:
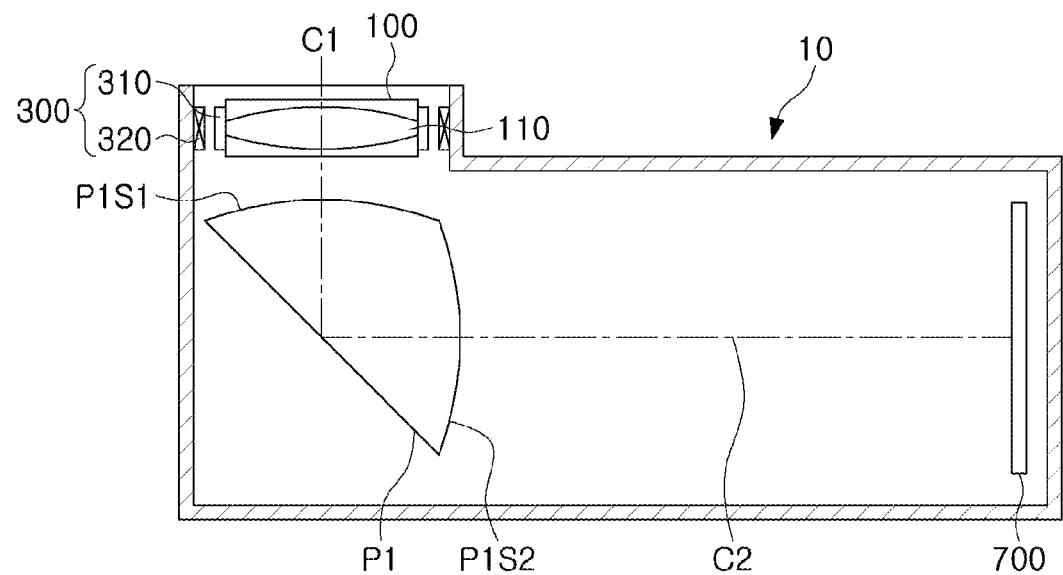
FIGS. 2 to 4 are configuration diagrams of camera modules each using a modified example of a first prism.
Figure 3:
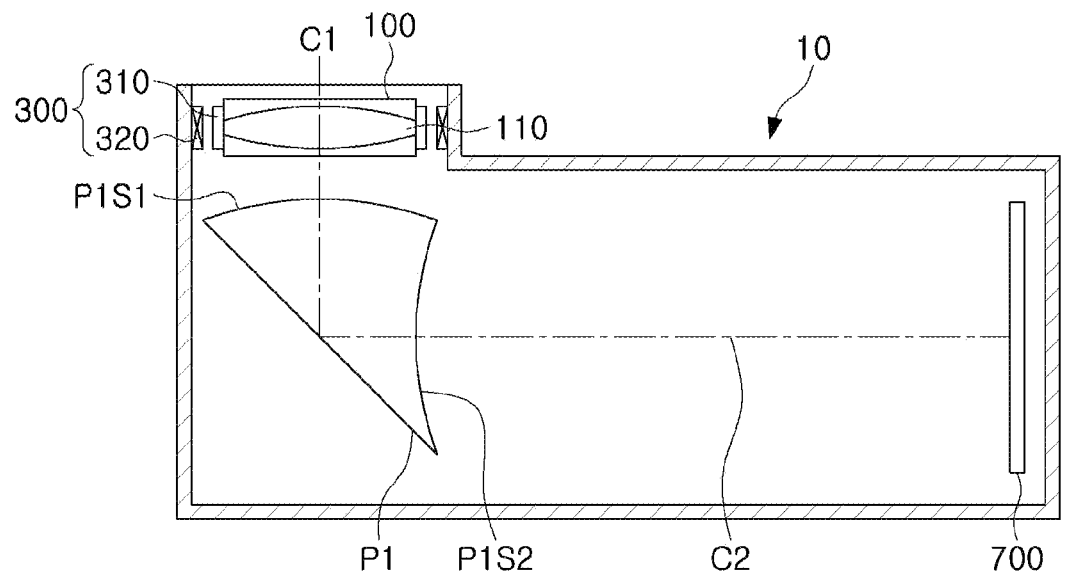
Figure 4:
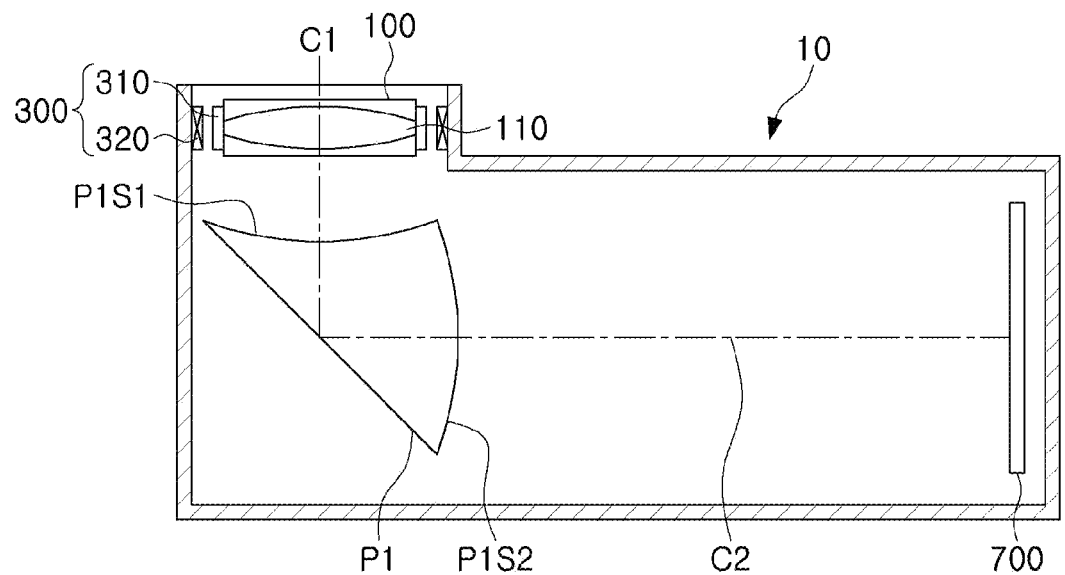
Figure 5:
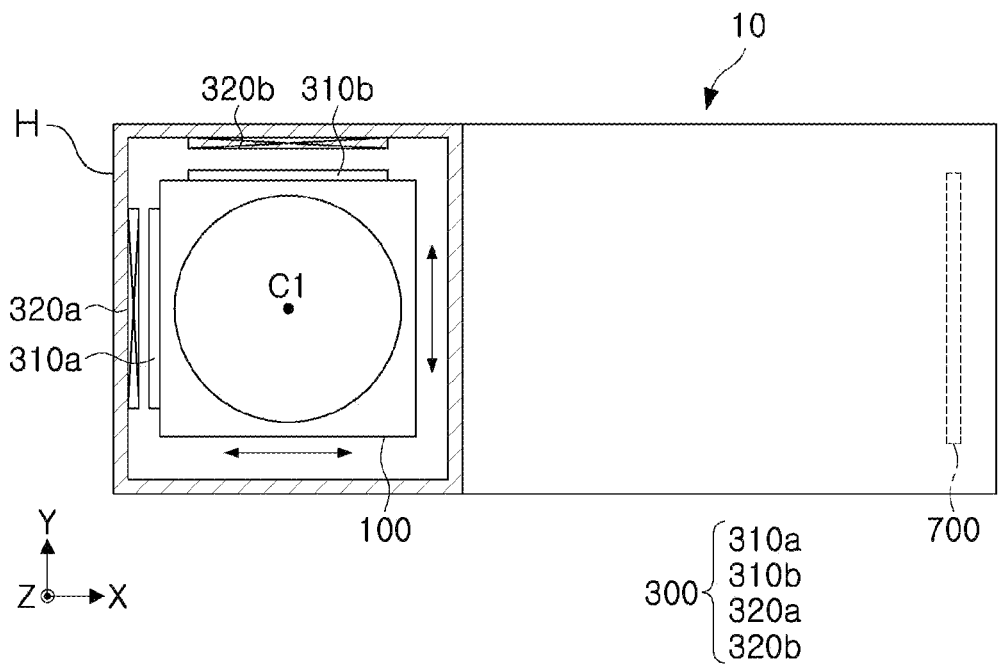
FIG. 5 shows an example of the configuration and operation of a first driving member shown in FIG. 1.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

In describing the present disclosure below, a term indicating a component of the present disclosure will be named in consideration of a function of each component. Therefore, the term should not be understood as limiting the technical component of the present disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module having a minimized installation space.

In each lens, an object-side surface or a first surface is a surface of the lens closest to the object side of the optical imaging system, and an image-side surface or a second surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including the optical axis of the lens surface in which light rays incident to the lens surface make a small angle $\theta$ to the optical axis, and the approximations $\sin\theta \approx \theta$, $\tan\theta \approx \theta$, and $\cos\theta \approx 1$ are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

A camera module in the present specification may be mounted on an electronic device. For example, the camera module may be mounted on a portable terminal, a laptop computer, a virtual reality (VR) device, glasses or the like. However, the electronic devices on which the camera module may be mounted are not limited to the above devices. For example, the camera module may be mounted on all portable electronic devices such as portable game machines.

Hereinafter, example embodiments of the present disclosure will now be described in detail with reference to the accompanying drawings.

First, a camera module according to an example embodiment is described with reference to FIGS. 1 through 5.

A camera module 10 according to this example embodiment may include a first lens module 100, a first prism P1, and a first driving member 300. However, the camera module 10 is not limited to including only the above-mentioned components. For example, the camera module 10 may further include an image sensor 700 converting an optical signal into an electrical signal. In addition, the camera module 10 may further include a housing H which may accommodate all of the first lens module 100, the first prism P1, and the first driving member 300. For reference, although FIG. 1 shows that the housing is one member, the housing may include a plurality of members which may be separated from each other and coupled with each other if necessary.

The first lens module 100 may include one or more lenses. For example, the first lens module 100 may include one lens (i.e., first lens 110). However, the number of lenses included in the first lens module 100 is not limited to one. For example, the first lens module 100 may include two or more lenses.

The first lens 110 may be disposed at the forefront of the first lens module 100. For example, the first lens 110 may be disposed closest to an object (or subject). The first lens 110 may have refractive power. For example, the first lens 110 may have positive refractive power. However, the refractive power of the first lens 110 is not limited to the positive refractive power. For example, the first lens 110 may have negative refractive power. The first lens 110 may have one convex surface. For example, an object-side surface of the first lens 110 may have a convex shape. However, the object-side surface of the first lens 110 may not necessarily have the convex shape. For example, the shape of the first lens 110 may be variously contoured based on the refractive power of the first lens 110.

The first prism P1 may be disposed behind the first lens module 100. In detail, the first prism P1 may be disposed adjacently to an image-side surface of the rearmost lens of the first lens module 100. A rearmost lens refers to a lens disposed closest to an image side and a frontmost lens refers to a lens disposed closest to an object side. The first prism P1 may reflect light incident through the first lens module 100 to the image sensor 700. In detail, the first prism P1 may reflect light incident along a first optical axis C1 of the first lens module 100 toward a second optical axis C2 of the image sensor 700.

The first prism P1 may have refractive power. For example, the first prism P1 may have positive or negative refractive power. In detail, at least one of the first surface P1S1 (i.e., object-side surface) and second surface P1S2 (i.e., image-side surface) of the first prism P1 may have a convex or a concave shape as shown in FIGS. 1 through 4. The first prism P1 configured as above may reduce the number of lenses of the first lens module 100.

The first driving member 300 may drive the first lens module 100. For example, the first driving member 300 may move the first lens module 100 in a direction intersecting the first optical axis C1. The first driving member 300 may include a first driving magnet 310 and a first driving coil 320. However, the first driving member 300 is not limited to including only the first driving magnet 310 and the first driving coil 320. For example, the first driving member 300 may include a piezoelectric element driven based on a current signal.

The first driving magnet 310 may be disposed on the first lens module 100 and the first driving coil 320 may be disposed in the housing. In detail, a plurality of first driving magnets 310a and 310b may be disposed on different side surfaces of the first lens module 100, and a plurality of first driving coils 320a and 320b may be disposed on different inner side surfaces of the housing H. The first driving magnets 310a and 310b and the first driving coils 320a and 320b may respectively substantially face each other. For example, the first driving magnet 310a may face the first driving coil 320a, and the first driving magnet 310b may face the first driving coil 320b.

The first driving magnets 310a and 310b and the first driving coils 320a and 320b may move the first lens module 100 in two or more directions intersecting the first optical axis C1. For example, the first driving magnets 310a and 310b may be disposed on two adjacent side surfaces of the first lens module 100, and the first driving coils 320a and 320b may respectively face the first driving magnets 310a and 310b. For reference, four pairs of first driving magnets 310 and first driving coils 320 may surround four side surfaces of the first lens module 100 to drive the first lens module 100 more rapidly.

The first driving member 300 configured as above may move the first lens module 100 in the direction intersecting the first optical axis C1, thereby reducing resolution degradation of the camera module 10 caused by an external impact or a user's hand trembling.

The image sensor 700 may be disposed behind (or adjacent to the image-side surface) of the first prism P1. The image sensor 700 may convert the optical signal into the electrical signal. For example, the image sensor 700 may be a charged coupled device (CCD). The image sensor 700 may be disposed at a considerable distance from the first prism P1. For example, the distance from (the image surface of) the image sensor 700 to (a reflection surface of) the first prism P1 may be greater than a distance from (the image-side surface of) the first lens module 110 to (a reflection surface of) the first prism P1.

In the camera module 10 configured as above, the first prism P1 may have the refractive power, thereby not only enabling a smaller size of the first lens module 100 but also reducing an overall size of the camera module 10.

Figure 6:
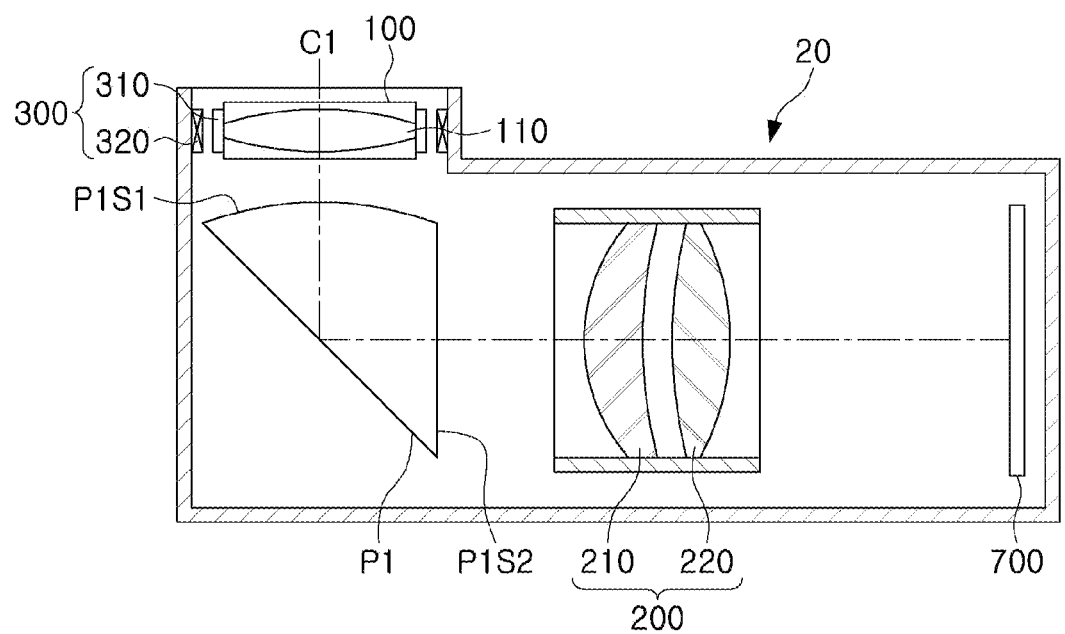
FIG. 6 is a configuration diagram of a camera module according to another example embodiment of present disclosure.

Next, a camera module according to another example embodiment is described with reference to FIGS. 6 through 8.

A camera module 20 according to this example embodiment may include a first lens module 100, a first prism P1, a second lens module 200, a first driving member 300, and an image sensor 700. However, the camera module 20 is not limited to including only the above-mentioned components. For example, the camera module 20 may further include a second driving member 400 as shown in FIG. 8.

The first lens module 100 may include one or more lenses. For example, the first lens module 100 may include one lens (i.e., first lens 110). However, the number of lenses included in the first lens module 100 is not limited to one. For example, the first lens module 100 may include two or more lenses.

The first lens 110 may be disposed at the forefront of the first lens module 100. For example, the first lens 110 may be disposed closest to an object (or subject). The first lens 110 may have refractive power. For example, the first lens 110 may have positive refractive power. However, the refractive power of the first lens 110 is not limited to the positive refractive power. For example, the first lens 110 may have negative refractive power. The first lens 110 may have one convex surface. For example, an object-side surface of the first lens 110 may have a convex shape. However, the object-side surface of the first lens 110 may not necessarily have the convex shape. For example, the shape of the first lens 110 may be variously contoured based on the refractive power of the first lens 110.

The first prism P1 may be disposed behind the first lens module 100. In detail, the first prism P1 may be disposed adjacently to an image-side surface of the rearmost lens of the first lens module 100. The first prism P1 may reflect light incident through the first lens module 100 to the image sensor 700. In detail, the first prism P1 may reflect light incident along a first optical axis C1 of the first lens module 100 toward a second optical axis C2 of the image sensor 700.

The first prism P1 may have refractive power. For example, the first prism P1 may have positive or negative refractive power. In detail, at least one of the first surface P1S1 (i.e., object-side surface) and second surface P1S2 (i.e., image-side surface) of the first prism P1 may have a convex or a concave shape as described in an example embodiment. The first prism P1 configured as above may reduce the number of lenses of the first lens module 100.

The first driving member 300 may drive the first lens module 100. For example, the first driving member 300 may move the first lens module 100 in a direction intersecting the first optical axis C1. The first driving member 300 may include a first driving magnet 310 and a first driving coil 320. However, the first driving member 300 is not limited to including only the first driving magnet 310 and the first driving coil 320. For example, the first driving member 300 may include a piezoelectric element driven based on a current signal.

The image sensor 700 may be disposed behind (or adjacent to the image-side surface) of the first prism P1. The image sensor 700 may convert an optical signal into an electrical signal. For example, the image sensor 700 may be a charged coupled device (CCD). The image sensor 700 may be disposed at a considerable distance from the first prism P1. For example, the distance from (the image surface of) the image sensor 700 to (a reflection surface of) the first prism P1 may be greater than a distance from (the image-side surface of) the first lens module 110 to (a reflection surface of) the first prism P1.

The camera module 20 according to this example embodiment may further include the second lens module 200. The second lens module 200 may be disposed between the first prism P1 and the image sensor 700. The second lens module 200 may include one or more lenses. For example, the second lens module 200 may include a second lens 210 and a third lens 220. However, the number of lenses included in the second lens module 200 is not limited to two. For example, the second lens module 200 may include three or more lenses.

Figure 7:
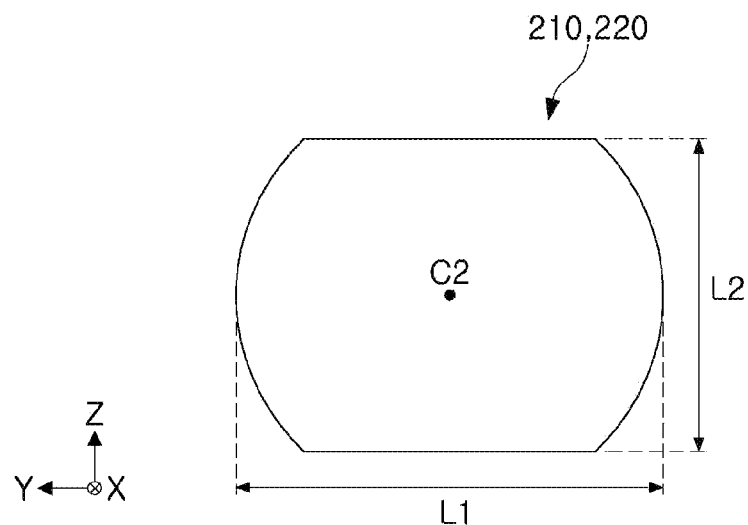
FIG. 7 is a front view of some lenses included in a second lens module shown in FIG. 6.
Figure 8:
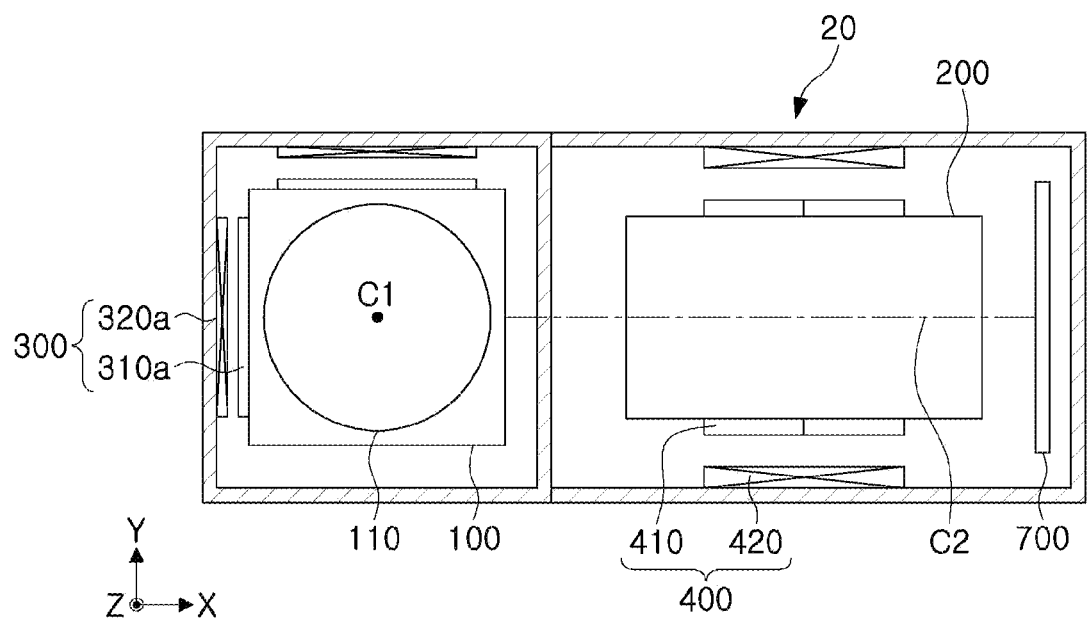
FIG. 8 is a modified example of the camera module shown in FIG. 6.

As shown in FIG. 7, at least one of the lenses 210 and 220 included in the second lens module 200 may have a length L1 in a first direction (Y-axis direction) intersecting the second optical axis C2 and a length L2 in a second direction (Z-axis direction) intersecting the second optical axis C2 that are different from each other. For example, as shown in FIG. 7, the second lens 210 and the third lens 220 may have at least two side surfaces each cut in a straight line. The second lens module 200 configured as above may reduce a height in the direction of the first optical axis C1 (i.e., Z-direction), which may be advantageous to reduce a thickness of the camera module 20.

The camera module 20 according to this example embodiment may further include a component for performing an auto focusing (AF) function or a zoom function. For example, as shown in FIG. 8, the camera module 20 may further include the second driving member 400 driving the second lens module 200 along the second optical axis C2. The second driving member 400 may include a second driving magnet 410 and a second driving coil 420. However, the second driving member 400 is not limited to including only the second driving magnet 410 and the second driving coil 420.

The second driving magnet 410 may be disposed on the second lens module 200. For example, the second driving magnet 410 may be disposed on each of two side surfaces of the second lens module 200. The second driving coil 420 may interact with the second driving magnet 410 to generate a driving force necessary for movement of the second lens module 200. For example, the second driving coil 420 may substantially face the second driving magnet 410.

In the camera module 20 configured as above, the first prism P1 may have the refractive power, thereby not only enabling a smaller size of the first lens module 100 or the second lens module 200 but also reducing an overall size of the camera module 20. In addition, the camera module 20 according to this example embodiment may include the plurality of lens modules 100 and 200, thereby improving resolution of the camera module 20.

Figure 9:
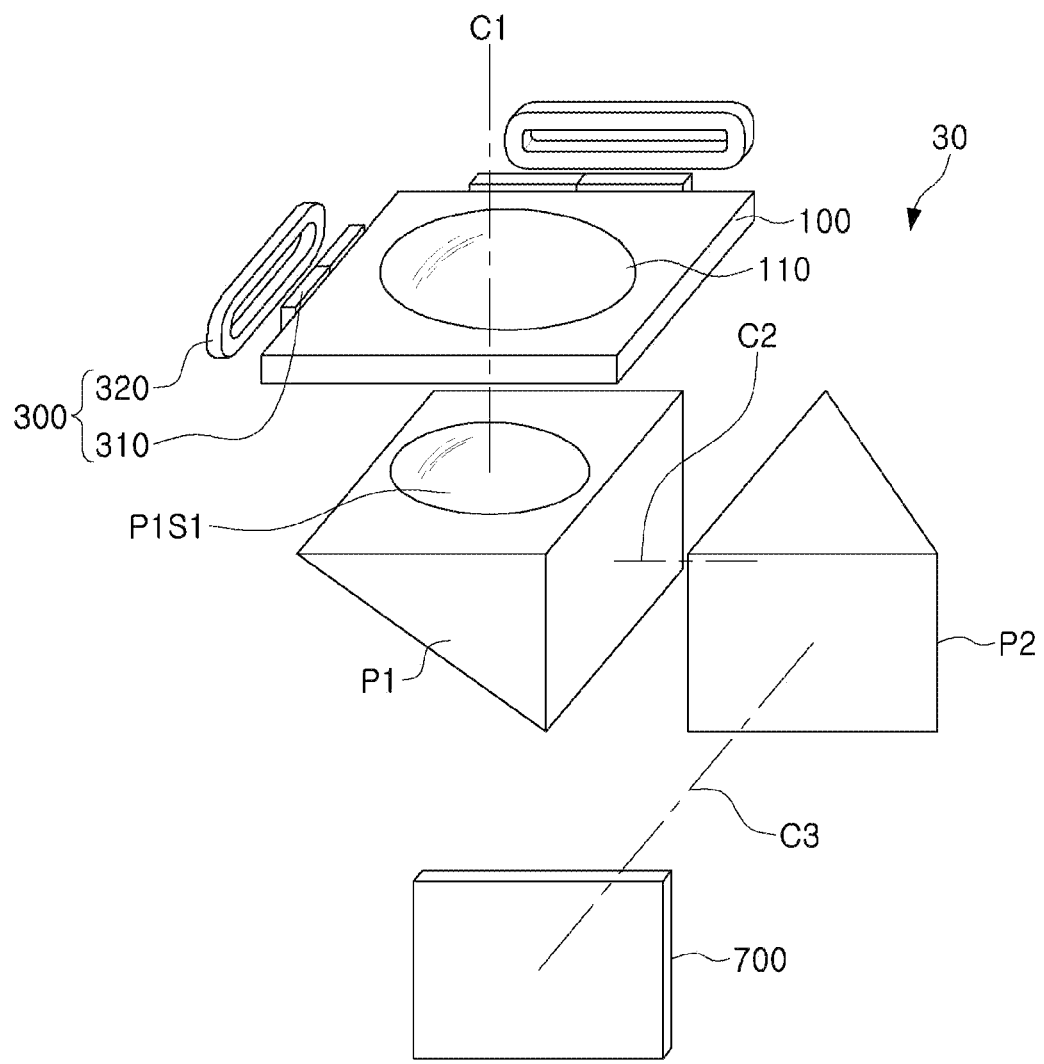
FIG. 9 is a configuration diagram of a camera module according to another example embodiment of present disclosure.
Figure 10:
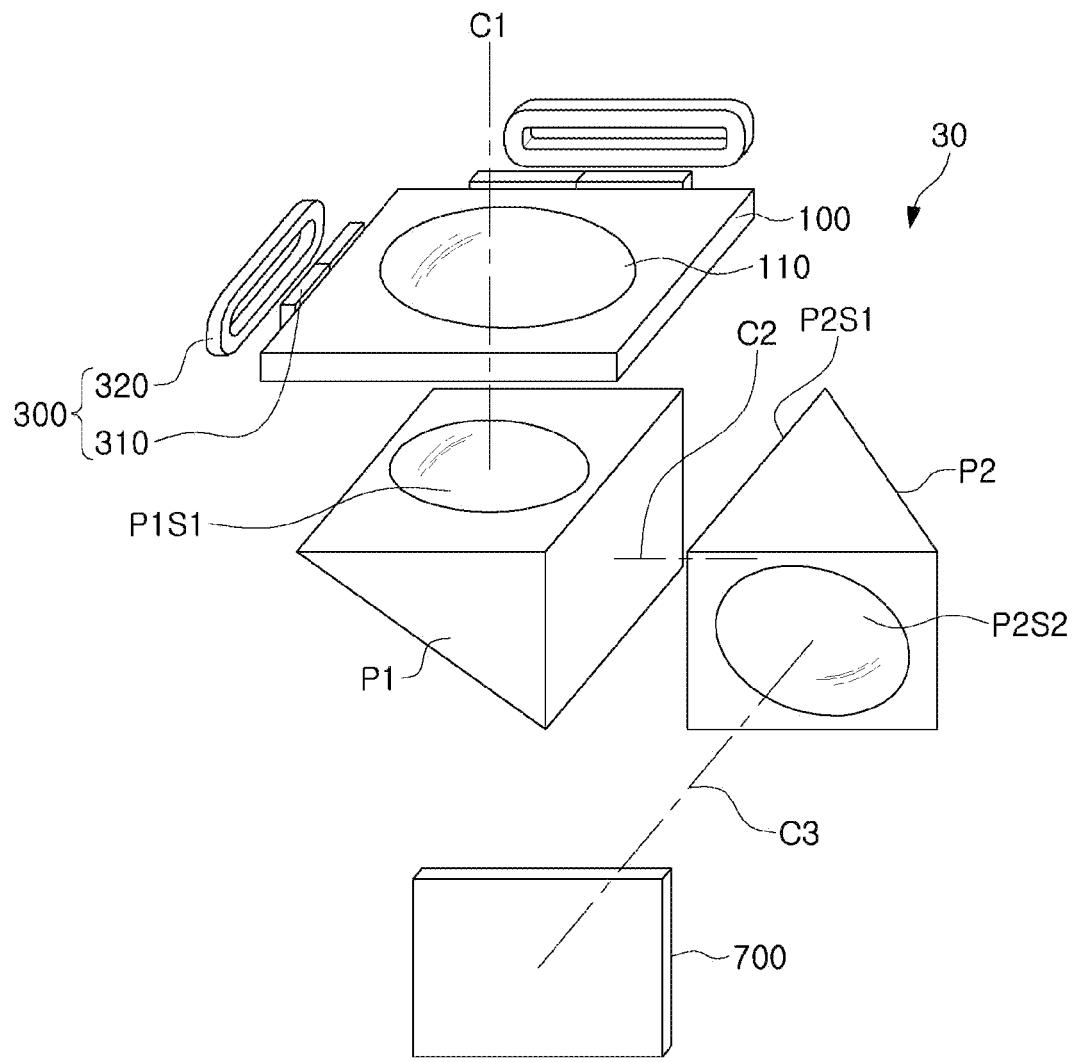
FIGS. 10 and 11 are modified examples of the camera module shown in FIG. 9.

Next, a camera module according to another example embodiment is described with reference to FIGS. 9 through 11.

A camera module 30 according to this example embodiment may include a first lens module 100, a first prism P1, a second prism P2, a first driving member 300, and an image sensor 700. However, the camera module 30 is not limited to including only the above-mentioned components. For example, the camera module 30 may further include a second lens module 200 as shown in FIG. 11.

The first lens module 100 may include one or more lenses. For example, the first lens module 100 may include one lens (i.e., first lens 110). However, the number of lenses included in the first lens module 100 is not limited to one. For example, the first lens module 100 may include two or more lenses.

The first lens 110 may be disposed at the forefront of the first lens module 100. For example, the first lens 110 may be disposed closest to an object (or subject). The first lens 110 may have refractive power. For example, the first lens 110 may have positive refractive power. However, the refractive power of the first lens 110 is not limited to positive refractive power. For example, the first lens 110 may have negative refractive power. The first lens 110 may have one convex surface. For example, an object-side surface of the first lens 110 may have a convex shape. However, the object-side surface of the first lens 110 may not necessarily have the convex shape. For example, the shape of the first lens 110 may be variously contoured based on the refractive power of the first lens 110.

The first prism P1 may be disposed behind the first lens module 100. In detail, the first prism P1 may be disposed adjacently to an image-side surface of the rearmost lens of the first lens module 100. The first prism P1 may reflect light incident through the first lens module 100 to the image sensor 700. In detail, the first prism P1 may reflect light incident along a first optical axis C1 of the first lens module 100 toward a second optical axis C2 of the image sensor 700.

The first prism P1 may have refractive power. For example, the first prism P1 may have positive or negative refractive power. In detail, at least one of the first surface P1S1 (i.e., object-side surface) and second surface P1S2 (i.e., image-side surface) of the first prism P1 may have a convex or a concave shape as described in an example embodiment. The first prism P1 configured as above may reduce the number of lenses of the first lens module 100.

The first driving member 300 may drive the first lens module 100. For example, the first driving member 300 may move the first lens module 100 in a direction intersecting the first optical axis C1. The first driving member 300 may include a first driving magnet 310 and a first driving coil 320. However, the first driving member 300 is not limited to including only the first driving magnet 310 and the first driving coil 320. For example, the first driving member 300 may include a piezoelectric element driven based on a current signal.

The image sensor 700 may be disposed behind (or adjacent to the image-side surface) of the first prism P1. The image sensor 700 may convert an optical signal into an electrical signal. For example, the image sensor 700 may be a charged coupled device (CCD). The image sensor 700 may be disposed at a considerable distance from the first prism P1. For example, the distance from (the image surface of) the image sensor 700 to (a reflection surface of) the first prism P1 may be greater than a distance from (the image-side surface of) the first lens module 110 to (a reflection surface of) the first prism P1.

The camera module 30 according to this example embodiment may further include a component which may improve the compactness and telescopic performance of the camera module 30. For example, the camera module 30 may further include the second prism P2.

The second prism P2 may be disposed adjacently to the image-side surface of the first prism P1. As a specific example, the second prism P2 may be disposed between the first prism P1 and the image sensor 700. The second prism P2 may refract or reflect an optical path emitted from the first prism P1 along the second optical axis C2 toward a third optical axis C3 of the image sensor 700.

The second prism P2 may have refractive power like the first prism P1. For example, the second prism P2 may have positive or negative refractive power. As a specific example, as shown in FIG. 10, a second surface P2S2 (i.e., image-side surface) of the second prism P2 may have a convex shape. However, the second prism P2 is not limited to the shape shown in FIG. 10. For example, the second prism P2 having a first surface P2S1 (i.e., object-side surface) and the second surface P2S2, may have both surfaces convex, both surfaces concave, or one surface convex and the other surface concave. Like the first prism P1, the second prism P2 configured as above may reduce the number of lenses of the first lens module 100.

Figure 11:
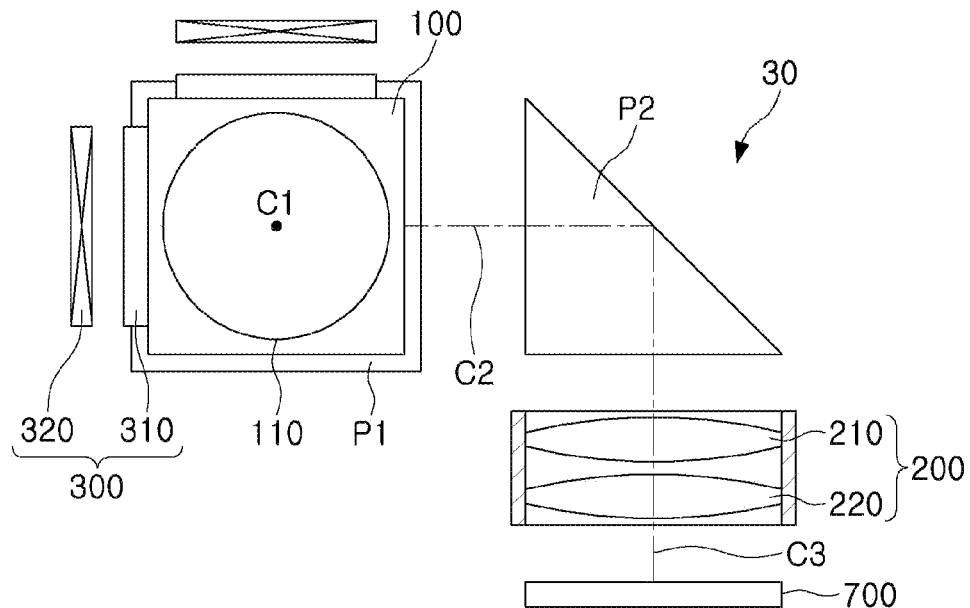
Figure 12:
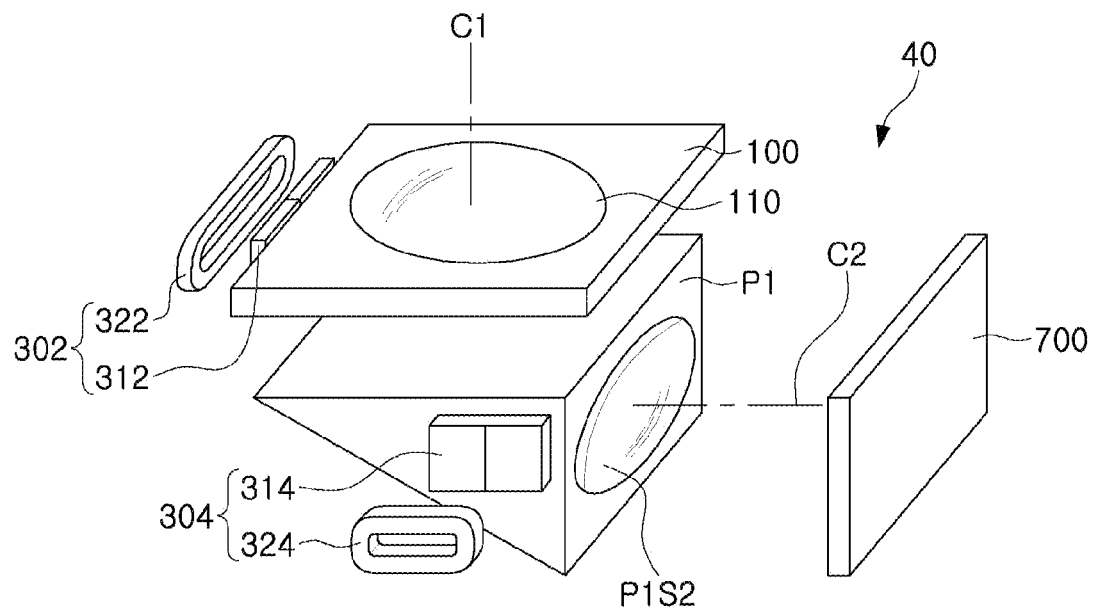
FIG. 12 is a configuration diagram of a camera module according to another example embodiment of present disclosure.

The camera module 30 according to this example embodiment may further include the second lens module 200 as shown in FIG. 11. The second lens module 200 may be disposed between the second prism P2 and the image sensor 700. The second lens module 200 may include one or more lenses. For example, the second lens module 200 may include a second lens 210 and a third lens 220. However, the number of lenses included in the second lens module 200 is not limited to two. For example, the second lens module 200 may include three or more lenses.

As described in the above-mentioned example embodiment, at least one of the lenses 210 and 220 included in the second lens module 200 may have a length L1 in a first direction (Y-axis direction) intersecting the second optical axis C2 and a length L2 in a second direction (Z-axis direction) intersecting the second optical axis C2 that are different from each other (see FIG. 7).

The camera module 30 configured as above may integrate the first prism P1 and the image sensor 700 in a limited space while maintaining the optical path from the first prism P1 to the image sensor 700, and thus be easily mounted in a small electronic device or a portable terminal.

In addition, the camera module 30 according to this example embodiment may greatly extend the distance from the first lens module 100 to the image sensor 700, thereby implementing a telephoto optical system having a long focal length.

Next, a camera module according to another example embodiment is described with reference to FIGS. 12 through 15.

A camera module 40 according to this example embodiment may include a first lens module 100, a first prism P1, a first driving member 302, a second driving member 304, and an image sensor 700. However, the camera module 40 is not limited to including only the above-mentioned components.

The first lens module 100 may include one or more lenses. For example, the first lens module 100 may include one lens (i.e., first lens 110). However, the number of lenses included in the first lens module 100 is not limited to one. For example, the first lens module 100 may include two or more lenses.

The first lens 110 may be disposed at the forefront of the first lens module 100. For example, the first lens 110 may be disposed closest to an object (or subject). The first lens 110 may have refractive power. For example, the first lens 110 may have positive refractive power. However, the refractive power of the first lens 110 is not limited to positive refractive power. For example, the first lens 110 may have negative refractive power. The first lens 110 may have one convex surface. For example, an object-side surface of the first lens 110 may have a convex shape. However, the object-side surface of the first lens 110 may not necessarily have the convex shape. For example, the shape of the first lens 110 may be variously contoured based on the refractive power of the first lens 110.

The first prism P1 may be disposed behind the first lens module 100. In detail, the first prism P1 may be disposed adjacently to an image-side surface of the rearmost lens of the first lens module 100. The first prism P1 may reflect light incident through the first lens module 100 to the image sensor 700. In detail, the first prism P1 may reflect light incident along a first optical axis C1 of the first lens module 100 toward a second optical axis C2 of the image sensor 700.

The first prism P1 may have refractive power. For example, the first prism P1 may have positive or negative refractive power. In detail, at least one of the first surface P1S1 (i.e., object-side surface) and second surface P1S2 (i.e., image-side surface) of the first prism P1 may have a convex or a concave shape as shown in FIGS. 1 through 4. The first prism P1 configured as above may reduce the number of lenses of the first lens module 100.

The first driving member 302 may drive the first lens module 100. For example, the first driving member 302 may move the first lens module 100 in a first direction intersecting the first optical axis C1. The first driving member 302 may include a first driving magnet 312 and a first driving coil 322. However, the first driving member 302 is not limited to including only the first driving magnet 310 and the first driving coil 320. For example, the first driving member 300 may include a piezoelectric element driven based on a current signal.

The second driving member 304 may drive the first prism P1. For example, the second driving member 304 may move the first prism P1 in a second direction intersecting the first optical axis C1. The second driving member 304 may include a second driving magnet 314 and a second driving coil 324. However, the second driving member 304 is not limited to including only the second driving magnet 314 and the second driving coil 324. For example, the second driving member 304 may include a piezoelectric element driven based on a current signal.

Figure 13:
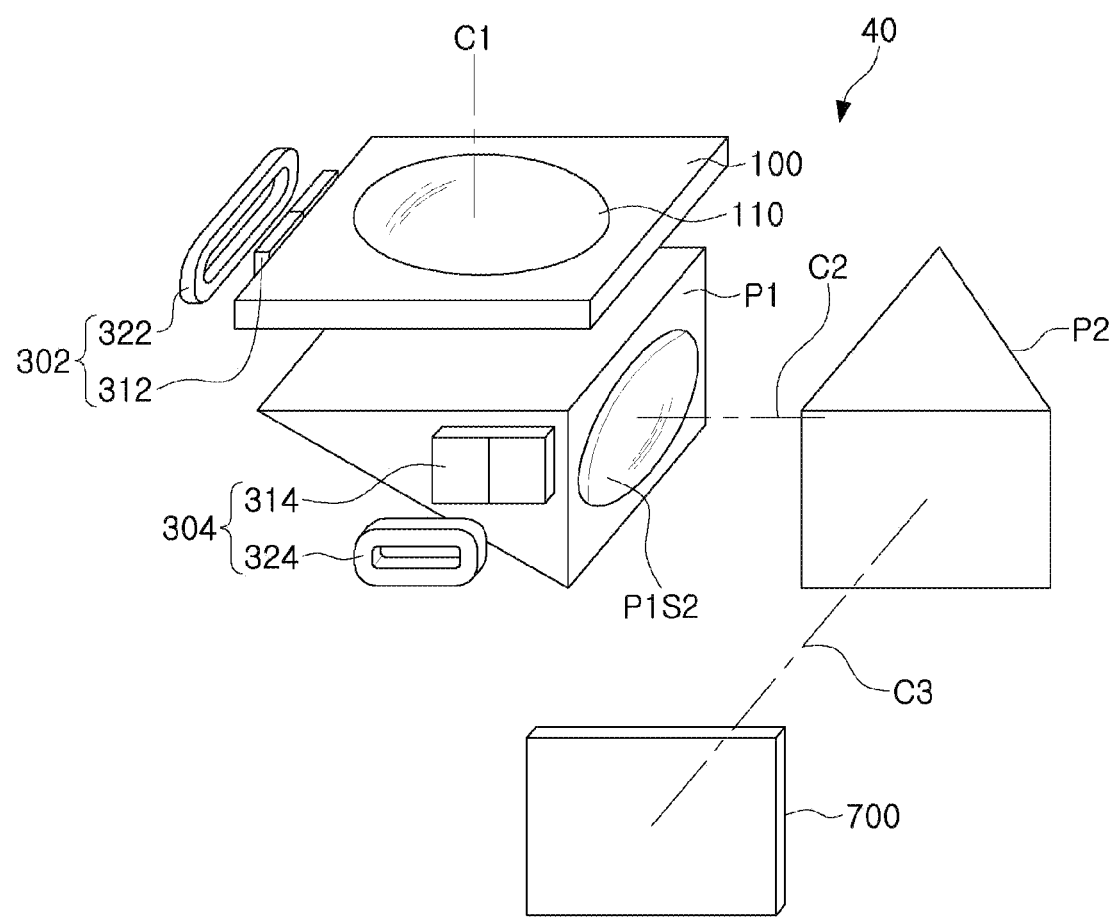
FIGS. 13 through 15 are modified examples of the camera module shown in FIG. 12.

The camera module 40 according to this example embodiment may further include a component which may improve the compactness and telescopic performance of the camera module 40. For example, the camera module 40 may further include a second prism P2 as shown in FIG. 13.

The second prism P2 may be disposed adjacently to the image-side surface of the first prism P1. As a specific example, the second prism P2 may be disposed between the first prism P1 and the image sensor 700. The second prism P2 may refract or reflect an optical path emitted from the first prism P1 along the second optical axis C2 toward a third optical axis C3 of the image sensor 700.

Figure 14:
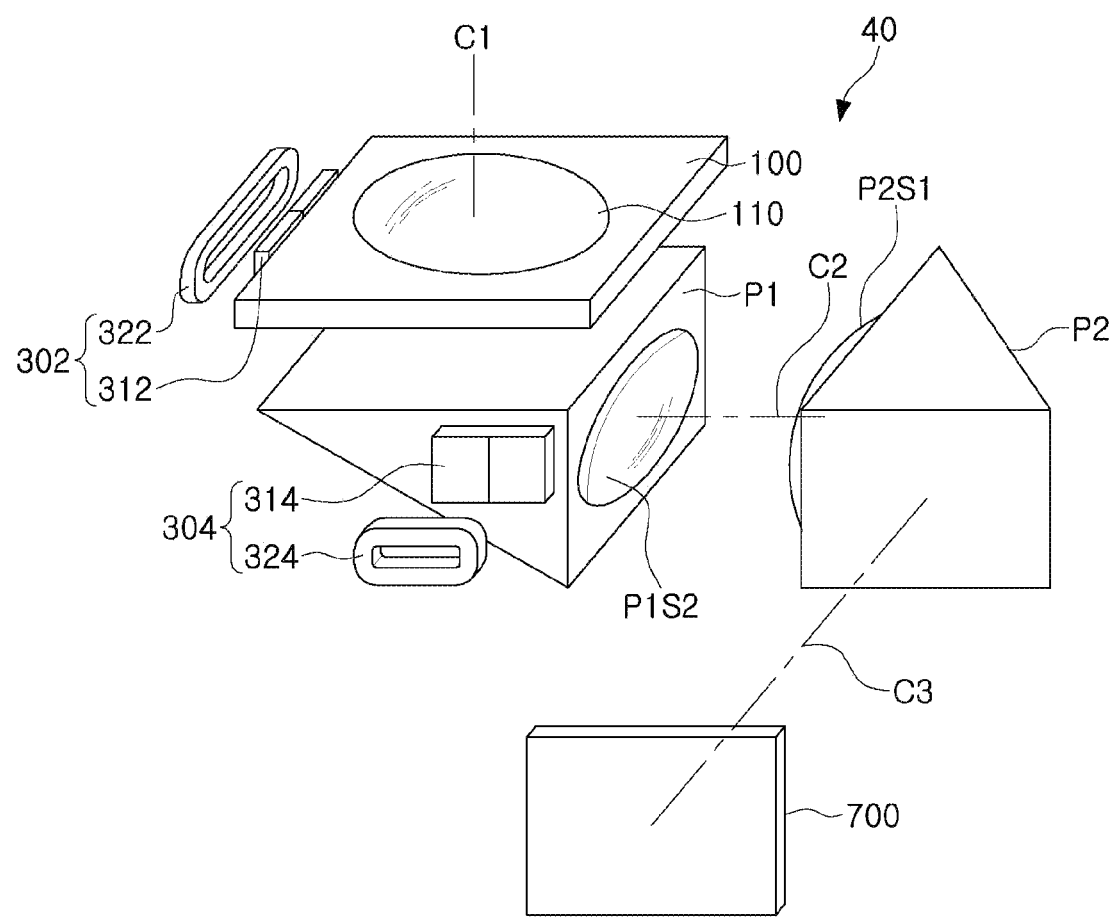

The second prism P2 may have refractive power like the first prism P1. For example, the second prism P2 may have positive or negative refractive power. As a specific example, as shown in FIG. 14, a first surface P2S1 (i.e., image-side surface) of the second prism P2 may have a convex shape. However, the second prism P2 is not limited to the shape shown in FIG. 14. For example, the second prism P2 having a first surface P2S1 (i.e., object-side surface) and the second surface P2S2, may have both surfaces convex, both surfaces concave, or one surface convex and the other surface concave. Like the first prism P1, the second prism P2 configured as above may reduce the number of lenses of the first lens module 100.

Figure 15:
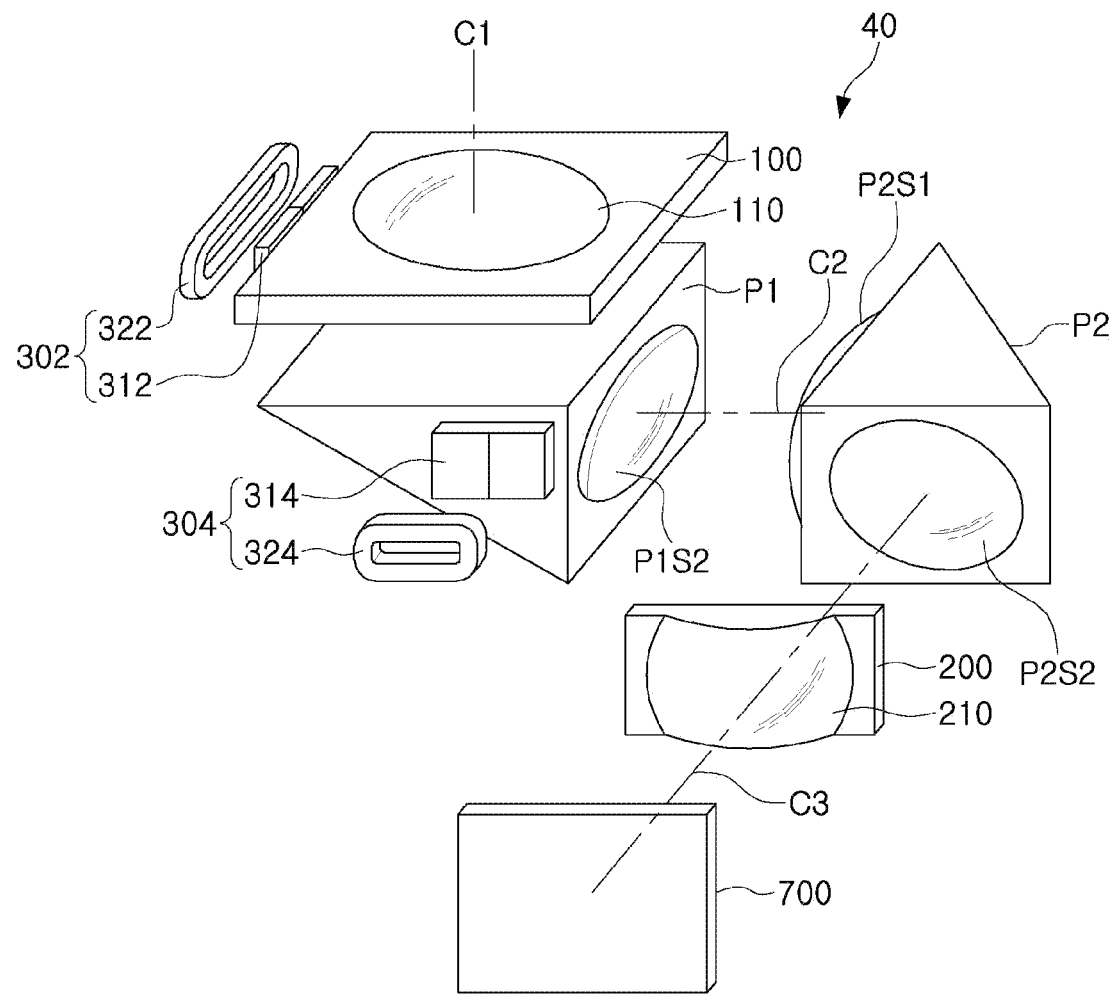

The camera module 40 according to this example embodiment may further include the second lens module 200 as shown in FIG. 15. The second lens module 200 may be disposed between the second prism P2 and the image sensor 700. The second lens module 200 may include one or more lenses. For example, the second lens module 200 may include a second lens 210. However, the number of lenses included in the second lens module 200 is not limited to one. For example, the second lens module 200 may include two or more lenses.

As shown in FIG. 15, the second lens 210 included in the second lens module 200 may have a length L1 in a first direction (Y-axis direction) intersecting the third optical axis C3 and a length L2 in a second direction (Z-axis direction) intersecting the third optical axis C3 that are different from each other.

The camera module 40 configured as above may integrate the first prism P1 and the image sensor 700 in a limited space while maintaining the optical path from the first prism P1 to the image sensor 700, and thus be easily mounted in a small electronic device or a portable terminal.

In addition, the camera module 40 according to this example embodiment may greatly extend the distance from the first lens module 100 to the image sensor 700, thereby implementing a telephoto optical system having a long focal length.

In addition, the camera module 40 according to this example embodiment may simultaneously move the first lens module 100 and the first prism P1, thereby rapidly performing an optical image stabilization while eliminating an external impact.

As set forth above, the present disclosure may provide the camera module which may be mounted in the small electronic product or the portable terminal while having the high-magnification optical performance.

For example, according to the present disclosure, it is possible to reduce the number of lenses necessary to implement high resolution, thereby reducing the overall size of the camera module.

For another example, according to the present disclosure, it is possible to change the position of the driving member necessary for the optical image stabilization, thereby enabling the smaller size or thickness of the camera module.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a first prism having refractive power;
a first lens module disposed adjacently to an object-side surface of the first prism; and
a first driving member driving the first lens module in a direction intersecting an optical axis.

2. The camera module of claim 1, wherein the first prism has an object-side surface or an image-side surface having a convex shape.

3. The camera module of claim 1, wherein the first prism has an object-side surface or an image-side surface having a concave shape.

4. The camera module of claim 1, wherein the first driving member includes a first driving magnet and a first driving coil.

5. The camera module of claim 1, further comprising a second lens module disposed between the first prism and an image sensor.

6. The camera module of claim 5, wherein the second lens module includes a non-circular lens having a length in a first direction intersecting the optical axis and a length in a second direction intersecting the optical axis that are different from each other.

7. The camera module of claim 5, further comprising a second driving member driving the second lens module along the optical axis.

8. The camera module of claim 1, further comprising a second prism disposed adjacently to an image-side surface of the first prism.

9. The camera module of claim 8, wherein the second prism has refractive power.

10. The camera module of claim 9, wherein at least one of an object-side surface and an image-side surface of the second prism has a convex shape.

11. The camera module of claim 8, further comprising a second lens module disposed between the first prism and the second prism.

12. An electronic device comprising:
the camera module of claim 1; and
an image sensor configured to convert an optical signal of incident light passing through the first lens module and the first prism into an electrical signal.

13. A camera module comprising:
a first prism having refractive power;
a first lens module disposed adjacently to an object-side surface of the first prism;
a first driving member driving the first lens module in a first direction intersecting an optical axis; and
a second driving member driving the first prism in a second direction intersecting the optical axis.

14. The camera module of claim 13, further comprising a second prism disposed adjacently to an image-side surface of the first prism.

15. The camera module of claim 14, wherein the second prism has refractive power.

16. The camera module of claim 15, wherein at least one of an object-side surface and an image-side surface of the second prism has a convex shape.

17. The camera module of claim 14, further comprising a second lens module disposed between the first prism and the second prism.

18. An electronic device comprising:
the camera module of claim 13; and
an image sensor configured to convert an optical signal of incident light passing through the first lens module and the first prism into an electrical signal.

19. An electronic device comprising:
a camera module comprising:
a first prism changing a path of incident light,
a first lens module disposed on an object-side surface of the first prism,
a second prism having refractive power disposed on an image-side surface of the first prism, and
an image sensor configured to convert an optical signal of incident light passing through the first lens module, the first prism, and the second prism into an electrical signal,
wherein the first prism has refractive power.

20. The electronic device of claim 19, further comprising a first driving member driving the first lens module in a first direction intersecting an optical axis.

* * * * *